United States Patent
Rengaraju et al.

(10) Patent No.: US 7,499,719 B2
(45) Date of Patent: Mar. 3, 2009

(54) METHOD AND APPARATUS FOR MIXED MODE MULTIMEDIA CONFERENCING

(75) Inventors: Ganesan Rengaraju, Oak Park, IL (US); Gary J. Oswald, Elk Grove Vlg., IL (US); Lawrence A. Willis, McHenry, IL (US); Balakumar Jagadesan, Glendale Heights, IL (US)

(73) Assignee: Mototola, Inc., Schaumburg, IL (US)

( * ) Notice: Subject to any disclaimer, the term of this patent is extended or adjusted under 35 U.S.C. 154(b) by 612 days.

(21) Appl. No.: 11/159,850

(22) Filed: Jun. 22, 2005

(65) Prior Publication Data

US 2006/0293073 A1 Dec. 28, 2006

(51) Int. Cl.
*H04B 7/00* (2006.01)
*H04Q 7/20* (2006.01)

(52) U.S. Cl. .................. 455/518; 455/519; 455/415; 370/260

(58) Field of Classification Search .......... 455/3.05, 455/458, 445, 416, 463, 516–519; 370/352, 370/354, 373, 377, 384, 385, 522, 524, 401, 370/341, 468, 335, 260, 329, 342; 379/229, 379/221.08, 221.09, 221.1, 221.12
See application file for complete search history.

(56) References Cited

U.S. PATENT DOCUMENTS

| | | | |
|---|---|---|---|
| 7,283,489 B2 * | 10/2007 | Palaez et al. | 370/277 |
| 7,330,542 B2 * | 2/2008 | Kauhanen et al. | 379/229 |
| 2002/0033880 A1 * | 3/2002 | Sul et al. | 348/14.09 |
| 2003/0016632 A1 * | 1/2003 | Refai et al. | 370/260 |
| 2004/0057405 A1 | 3/2004 | Black | |
| 2004/0057412 A1 * | 3/2004 | Curcio et al. | 370/341 |
| 2005/0013309 A1 | 1/2005 | Ravishankar et al. | |
| 2006/0120308 A1 * | 6/2006 | Forbes et al. | 370/260 |
| 2007/0153777 A1 * | 7/2007 | Coulas et al. | 370/356 |
| 2007/0218924 A1 * | 9/2007 | Burman et al. | 455/466 |
| 2008/0031227 A1 * | 2/2008 | Wang | 370/352 |

OTHER PUBLICATIONS

3rd Generation Partnership Project; Technical Specification Group Services and System Aspects; IP Multimedia Subsystem (IMS); Stage 2 (Release 5), 3GPP TS 23.228, V5.11.0 (Dec. 2003), p. 1-5 and 93-102, 3GPP Organizational Partners, France.

D McDonald et al., PF-KEY Key Management API, Version 2, Network Working Group, Jul. 1998, p. 1-68, The Internet Society, USA.

(Continued)

*Primary Examiner*—Sujatha Sharma
(74) *Attorney, Agent, or Firm*—Ingrassia, Fisher & Lorenz, P.C.

(57) ABSTRACT

A method and apparatus is provided for mixed mode conference call setup. The method includes the steps of inviting users to a mixed mode conference call by providing invitation information from an inviting user to a server and thereby providing invitations from the server to each of the users. The invitation information indicates the users, the modes acceptable for the conference call and the mode accepted by the inviting user. The invitations from the server include information indicating the modes acceptable for the conference call. The users provide a response to the server which includes information indicating a selected mode accepted by each user. The server sets up a conference call where each of the users and the inviting user communicate in the selected modes accepted by each.

19 Claims, 9 Drawing Sheets

OTHER PUBLICATIONS

J. Rosenberg et al., SIP: Session Initiation Protocol, Network Working Group, Jun. 2002, p. 1-269, The Internet Society, USA.
H. Schulzrinne et al., RTP: A Transport Protocol for Real-Time Applications, Network Working Group, Jul. 2003, p. 1-98, The Internet Society, USA.

PCT Search report PCT/US2006/019395 dated Jul. 25, 2007.
Rosenberbg, J., et al., Models for Multi Party Conferencing In SIP, IETF Standard-Workng-Draft, Internet Engineering Task Force, IETF, CH. No. 1, Jul. 20, 2001.

* cited by examiner

```
 0        712            1                   2             710  3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| SUBTYPE |   PT=APP=204  |            LENGTH= 3          |
+-+-+-+-+-+-+-+-+-+-+-+-+-+-+-+-+-+-+-+-+-+-+-+-+-+-+-+-+-+-+-+-+
|                       SSRC OF UE                          ~718
+-+-+-+-+-+-+-+-+-+-+-+-+-+-+-+-+-+-+-+-+-+-+-+-+-+-+-+-+-+-+-+-+
|                       NAME = PTV1                         ~714
+-+-+-+-+-+-+-+-+-+-+-+-+-+-+-+-+-+-+-+-+-+-+-+-+-+-+-+-+-+-+-+-+
| MEDIA | PADDING                                            • • •
+-+-+-+-+-+-+-+-+-+-+-+-+-+-+-+-+-+-+-+-+-+-+-+-+-+-+-+-+-+-+-+-+
  716                                                   700
```

*FIG. 7*

```
 0        812            1                   2             810  3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| SUBTYPE |   PT=APP=204  |            LENGTH= 2          |
+-+-+-+-+-+-+-+-+-+-+-+-+-+-+-+-+-+-+-+-+-+-+-+-+-+-+-+-+-+-+-+-+
|                SSRC OF PoC + VIDEO SERVER                 ~814
+-+-+-+-+-+-+-+-+-+-+-+-+-+-+-+-+-+-+-+-+-+-+-+-+-+-+-+-+-+-+-+-+
|                       NAME = PTV1                         ~714
+-+-+-+-+-+-+-+-+-+-+-+-+-+-+-+-+-+-+-+-+-+-+-+-+-+-+-+-+-+-+-+-+
                                                          800
```

*FIG. 8*

```
 0        910            1                   2             912  3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| SUBTYPE |   PT=APP=204  |            LENGTH             |
+-+-+-+-+-+-+-+-+-+-+-+-+-+-+-+-+-+-+-+-+-+-+-+-+-+-+-+-+-+-+-+-+
|                SSRC OF PoC + VIDEO SERVER                 ~914
+-+-+-+-+-+-+-+-+-+-+-+-+-+-+-+-+-+-+-+-+-+-+-+-+-+-+-+-+-+-+-+-+
|                       NAME = PTV1                         ~712
+-+-+-+-+-+-+-+-+-+-+-+-+-+-+-+-+-+-+-+-+-+-+-+-+-+-+-+-+-+-+-+-+
| REASON CODE |    LENGTH      |       REASON PHRASE            |
+-+-+-+-+-+-+-+-+-+-+-+-+-+-+-+-+                    920         +
   916              918
+-+-+-+-+-+-+-+-+-+-+-+-+-+-+-+-+-+-+-+-+-+-+-+-+-+-+-+-+-+-+-+-+
                                                          900
```

*FIG. 9*

METHOD AND APPARATUS FOR MIXED MODE MULTIMEDIA CONFERENCING

FIELD OF THE INVENTION

The present invention generally relates to communication systems, and more particularly relates to mixed mode conferencing services on half duplex communication systems.

BACKGROUND OF THE INVENTION

Conventional conferencing services such as Push-To-Video (PTV) services permit an inviting user to set up a conference call, inviting other users to join. Typically, these conference calls are set up utilizing the internet and one of numerous internet protocols (IP). A Session Initiation Protocol (SIP) works in concert with other IPs by enabling user entities to discover one another and to agree on a characterization of a session they would like to share. SIP is an application-layer control protocol that can establish, modify, and terminate multimedia sessions (conferences). SIP can also invite participants to already existing sessions, such as multicast conferences.

Fundamentally the conference setup is based on an offer/answer model that requires agreeing on a common set of media modes and codec characteristics before starting a call. The common set of media modes of the call could be PTV Stream (audio or video streamed asynchronously to the participants in the packet domain), PTV Chat (audio and video streamed synchronously to the participants in the packet domain), or PTT (audio only). If the participants do not agree on the same number of media and common codec, then the conference call will not be successful. Additionally, if a participant needs to sign off of the audio services (such as going to mute in a high noise environment) or the video services (to conserve bandwidth or moving into an area which does not support the video), the participant's only option is to resign from the call.

Thus, what is needed is a method and apparatus for permitting mixed mode participants on a multimedia conference call. In addition, what is needed is a method and apparatus for allowing participants in such a multi-mode conference call to upgrade and/or downgrade participation in the multi-mode conference call by adding or resigning from modes of the conference call without resigning from the conference call. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

FIG. 7 is a Realtime Transfer Control Protocol (RTCP) packet structure for a user request for media addition or removal in accordance with the embodiment of the present invention;

FIG. 8 is an RTCP packet structure for a server response to a user request for media addition or removal in accordance with the embodiment of the present invention;

FIG. 9 is an RTCP packet structure for a server denial of a user request for media addition or removal in accordance with the embodiment of the present invention;

DETAILED DESCRIPTION OF THE INVENTION

Figure 1:
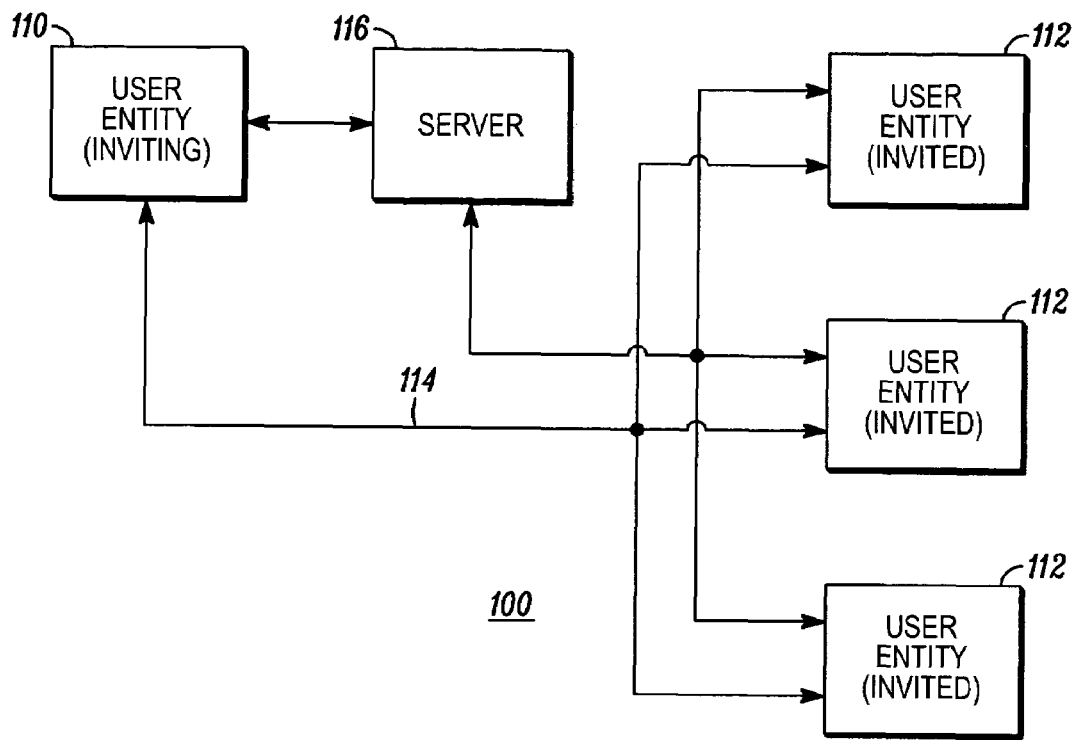
FIG. 1 is a block diagram of a communication system in accordance with an embodiment of the present invention.

A method and apparatus is provided for permitting mixed mode participants on a multimedia conference call. The method for mixed mode conference call setup includes inviting one or more users to a mixed mode conference call by providing invitation information from an inviting user to a server. The invitation information indicates the users, a plurality of modes acceptable for the conference call and a selected one of modes accepted by the inviting user. Invitations are then provided from the server to the users, the invitation including information indicating the plurality of modes acceptable for the conference call. Each user then provides a response to the server indicating which of the plurality of modes has been accepted by the user. The server then sets up a mixed mode multimedia conference call where each of the users (including the inviting user) communicates in their selected mode.

The mixed mode conference call may be a radio frequency (RF) conference call over RF communication channels, such as a Push-To-Video (PTV) conference call. The plurality of modes may be one or more of an audio-only mode, an audio and video mode, or an audio and video-mute mode.

When each of the users provides a response to the server indicating that they select a lower bandwidth requiring mode of the plurality of modes, such as an audio-only mode conference call, a message is provided to the inviting user requesting him to confirm that a lower bandwidth requiring conference call is acceptable. If acceptable, the lower bandwidth requiring conference call is set up.

Setting up the conference call includes setting up communication channels for the inviting user to communicate with each of the invited users, the communication channels having bandwidths selected in response to the selected mode accepted by the corresponding one of the invited users. If one of the users communicating on a communication channel having a first bandwidth sends a request to the server indicating that he desires to downgrade the previously selected mode, the server sets up a new communication channel for the user having a second bandwidth, the second bandwidth being smaller than the first bandwidth. Alternatively, if one of the users communicating on a communication channel having a first bandwidth sends a request to the server indicating that he desires to upgrade the previously selected mode, the server sets up a new communication channel for the user having a second bandwidth, the second bandwidth being larger than the first bandwidth.

A user can provide an automatic response to the server which includes information indicating a selected mode, the mode selected in response to an early media auto mode of the user. In addition, in response to a user receiving the invitation, the user may manually select one of the modes acceptable for the mixed mode conference call and provides a response to the server indicating the selected mode. An early session configuration setting for a predetermined user input may be stored and providing the predetermined user input and inviting users to a conference call provides invitation information from the inviting user to the server indicating the invited users, the modes acceptable for the conference call and a mode accepted by the inviting user, where the mixed mode conference call, the modes acceptable therefor, and the mode accepted by the inviting user are defined by the early session configuration setting in response to the predetermined user input. The early session configuration setting is may be Push-To-Video (PTV) Chat, PTV Stream or Push-To-Talk (PTT).

When an early session configuration setting for a predetermined user input is stored by the inviting user, providing the predetermined user input automatically invites one or more users to a mixed mode conference call by providing invitation information to the server indicating the invited users, the modes acceptable for the conference call, and the mode selected by the inviting user. The mixed mode conference call, the modes acceptable therefor, and the mode accepted by the inviting user are defined by the early session configuration setting in response to predetermined user input. The early session configuration setting may be Push-To-Video (PTV) Chat, PTV Stream or Push-To-Talk (PTT).

In a communication system having a plurality of user entities, a server includes an input handler, a conference call invitation controller, a conference call controller and an output handler. The input handler is coupled to the communication system and receives invitation information from an inviting user entity (the inviting user entity being one of the user entities). The invitation information indicates which user entities are invited user entities, a plurality of modes that are acceptable for a mixed mode conference call, and which of the plurality of modes is accepted by the inviting user entity. The input handler also receives messages from the plurality of user entities. The conference call invitation controller is coupled to the input handler and generates an invitation message in response to the invitation information—the invitation message including information indicating the plurality of modes acceptable for the mixed mode conference call. The output handler is coupled to the conference call invitation controller and the communication system for providing the invitation message to the communication system to forward to the invited user entities. And the conference call controller is coupled to the input handler for receiving the messages therefrom and determining, in response to the messages, which of the plurality of modes are accepted by the invited user entities. The conference call controller then sets up a mixed mode multimedia conference call where the invited user entities and the inviting user entity communicate on selected communication channels in response to the modes they accepted.

The conference call controller may also provide a message to the inviting user entity requesting the inviting user entity to confirm that a lower bandwidth requiring conference call is acceptable if the responses from each of the invited user entities included information indicating that each had selected the lower bandwidth requiring mode. If a response is received from the inviting user entity that the lower bandwidth requiring conference call is acceptable, the conference call controller sets up a lower bandwidth requiring conference call where each of the user entities communicate in the lower bandwidth requiring mode.

In addition, the conference call controller, after setting up the conference call, may set up a second communication channel for one of the user entities and terminate a first communication channel for him in response to a message from such user entity indicating that he desires to downgrade the mode previously selected, the second communication channel having a bandwidth smaller than the bandwidth of the first communication channel. Alternatively, the conference call controller, after setting up the conference call, may set up a second communication channel for one of the user entities and terminate a first communication channel for such user entity in response to a message from the user entity indicating that he desires to upgrade the previously selected mode, the second communication channel having a bandwidth larger than the bandwidth of the first communication channel.

A communication system includes plurality of user entities where one of the user entities can choose to be an inviting user entity for initiating a mixed mode multimedia conference call, choosing one or more other user entities to be invited user entities, each of the user entities coupleable to other user entities on one of a plurality of communication channels. The communication system also includes a server coupled to the inviting user entity and capable of coupling to other user entities. The server includes a conference call invitation controller and a conference call controller. The conference call invitation controller generates an invitation message in response to information received from the inviting user entity, the invitation message indicating a plurality of modes acceptable for the conference call. The conference call controller determines which of the plurality of modes have been accepted by each invited user entity and sets up a mixed mode multimedia conference call where each of the participating (inviting and invited) user entities communicate on communication channels selected in response to the modes accepted by them.

The conference call controller, after setting up the conference call, sets up a second communication channel for one of the participating user entities and terminates a first communication channel in response to the user entity indicating that he desires to change his previously selected mode, the second communication channel having a bandwidth smaller than a bandwidth of the first communication channel if the user entity indicates that he desires to downgrade the selected mode, or the second communication channel having a bandwidth larger than a bandwidth of the first communication channel if the user entity indicates that he desires to upgrade the selected mode.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIG. 1, a communication system 100 in accordance with an embodiment of the present invention comprises a plurality of user entities 110, 112. One of the plurality of user entities can choose to be an inviting user entity 110 for initiating a mixed mode conference call. The inviting user entity 110 can choose other user entities to be invited user entities 112. Each of the plurality of user entities 110, 112 is capable of being coupled to other of the plurality of user entities 110, 112 on one of a plurality of communication channels 114. To accommodate communication in accordance with the present invention, the communication channels 114 are typically half duplex communication channels. A server 116 is coupled to the inviting user entity 110 and can be coupled to the invited user entities 112. One such communication system is a plurality of workstations 110, 112 coupled to a local area network (LAN) for communication with each other and with a server 116 in the communication system.

Another such communication system is a cellular communication system which utilizes a server 116 to set up radio frequency (RF) communication channels 114 for various user entities 110, 112 on a RF conference call. One such RF conference call could be a Push-To-Video (PTV) conference call utilizing conventional PTV services. The communication system 100 allows group participants to participate in mixed call operation during a multimedia session. Although the concepts described here is in the context of Push to Video (PTV) services, the same can be applied to different multimedia data session scenarios. The present invention advantageously permits mixed mode operation during a RF conference call, thereby not requiring the user entities 110, 112 to agree on a common codec and mode of communication (i.e., the number of media utilized in the conference call). Accordingly, the present invention presents a mixed mode conference call which efficiently utilizes radio resources. In addition, users who wish to reduce billing during a conference call or are unable to provide attention to the video portion of the call may elect to receive only the audio portion of the conference call.

PTV is a real-time direct one-to-one or one-to-many video and audio communication service. The PTV services are an evolution from "Push to Talk" (PTT) service for audio, and shares many of the same characteristics. For example, streaming sessions can be initiated and sent to both individuals and talk groups with just a push of a key. Also, PTV services may permit either peer to peer calls or group calls or both.

PTV services support multiple service modes such as PTV Stream, PTV Chat, PTT, and PTV Video. PTV Stream is a mode which allows an inviting user entity 110 to stream the audio or video asynchronously to each of the session participant's invited user entities 112. At the start of the session, the inviting user entity 110 shall own both the audio and video floor. The inviting user entity 110 could then make an introductory comment about the video and thereafter elicit audio responses from the peer or group. The inviting user entity 110 would then relinquish the audio floor for responses while still streaming video. In this mode of operation, the floor control for audio and video media is handled asynchronously and both peer to peer and group calls are supported in this mode.

PTV Chat is a mode which allows an inviting user entity 110 to stream the audio and video synchronously to each of the session participant's invited user entities 112. The real-time audio and video streams are synchronized as the floor owner speaks to a peer or the group. When a floor owner gives up the floor, a listening peer or group user entity 110, 112 may then acquire control of the floor and stream synchronized audio and video. All participants then hear and see the new floor owner on their user entity 110, 112. In this mode of operation, the floor control for both audio and video media is always handled synchronously. Both peer to peer and group call PTV sessions are supported in this mode.

In the PTT mode, the PTV feature allows the user entity 110, 112 to participate in a PTT, audio only, session. In this case, no video media capability is included in the session setup. The ability to add a video stream in the existing audio session is supported in the communication system 100 in accordance with the present invention. Also, it is possible to remove a video stream after adding a video stream. Both peer to peer and group calls are supported in this mode.

Figure 2:
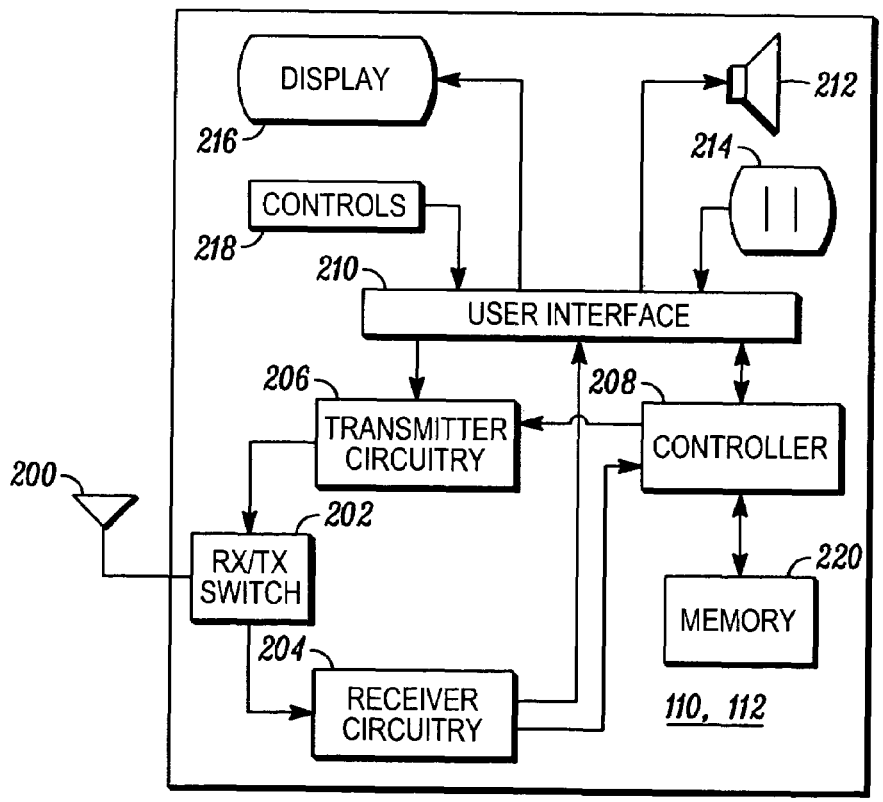
FIG. 2 is a block diagram of a user entity of the communication system of FIG. 1 in accordance with the embodiment of the present invention.

Referring to FIG. 2, a user entity 110, 112 in accordance with the embodiment of the present invention is shown. Although the user entity 110, 112 is depicted as a cellular telephone, the user entity 110, 112 can be implemented as a pager, a portable digital assistant (PDA), a laptop computer, a desktop computer or the like. The user entity 110, 112 includes an antenna 200 for receiving and transmitting radio frequency (RF) signals. A receive/transmit switch 202 selectively couples the antenna 200 to receiver circuitry 204 and transmitter circuitry 206 in a manner familiar to those skilled in the art. The receiver circuitry 204 demodulates and decodes the RF signals to derive information and is coupled to a controller 208 for providing the decoded information thereto for utilization thereby in accordance with the function(s) of the user entity 110, 112. The receiver circuitry 204 is also coupled to user interface circuitry 210 for providing decoded audio signals to a speaker 212 for broadcast therefrom.

The controller 208 also provides information to the transmitter circuitry 206 for encoding and modulating information into RF signals for transmission from the antenna 200. The transmitter circuitry 206 is also coupled to the user interface circuitry 210 for receiving audio signals from a microphone 214 for encoding and modulating such audio signals onto RF signals for transmission from the antenna 200. The controller 208 is also coupled via the user interface circuitry 210 to a display 216 for presenting video thereon and to user controls 218, such as a keypad, for receiving user input therefrom. One of the user controls 218 could be a PTV hard key for automatically setting up PTV communication in response to a single key press. The controller 208 is also coupled to a memory 220 for storing information therein and retrieving information therefrom. For example, in accordance with conventional PTV operation, an early media auto mode is an automatic operational mode of the user entity 110 with a default selection stored in the memory 220 of either audio only mode or audio with video mute mode, as explained herein.

Figure 3:
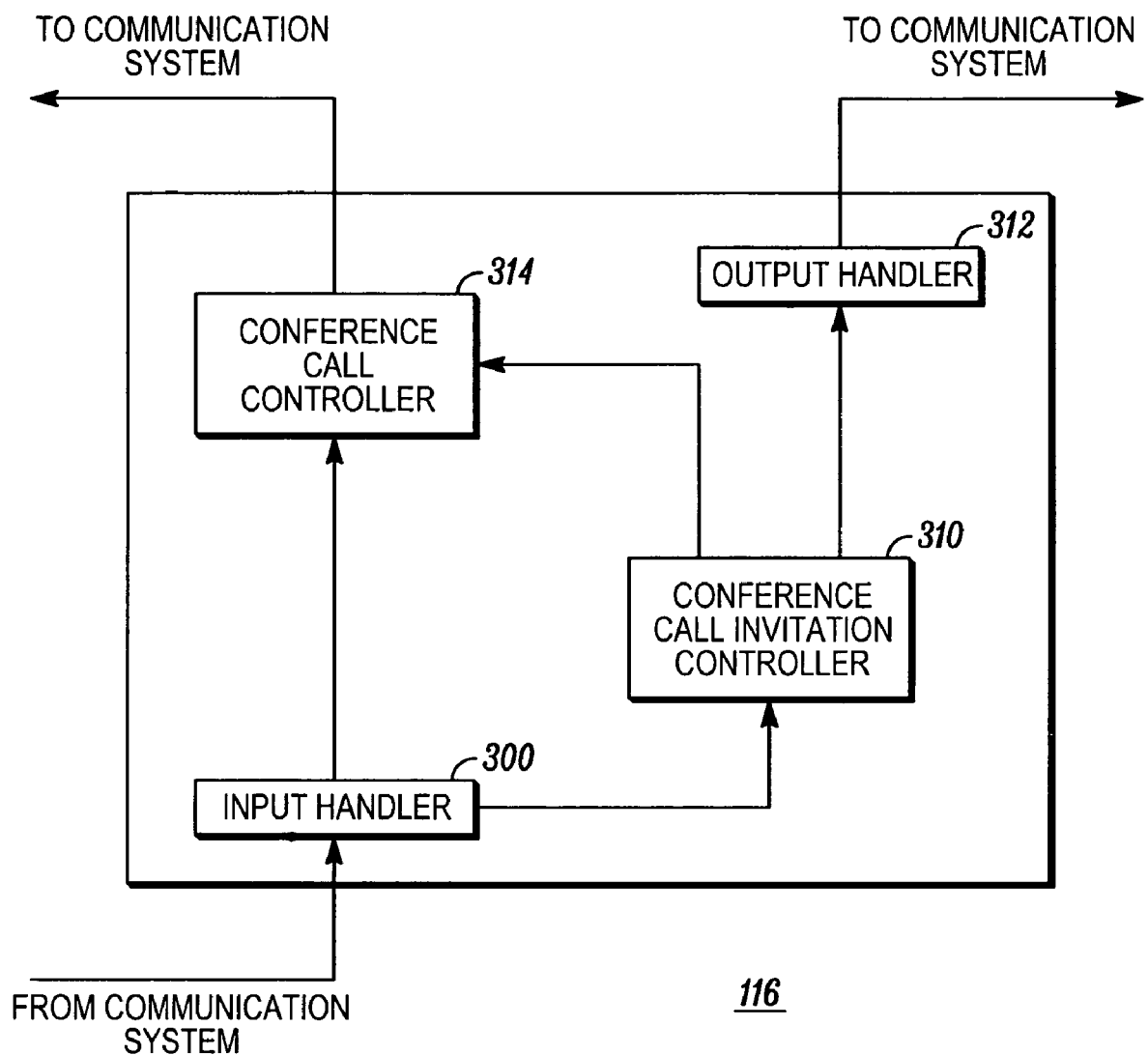
FIG. 3 is a block diagram of a server of the communication system in accordance with the embodiment of the present invention.

Referring to FIG. 3, a server in accordance with the present invention comprises an input handler 300 coupled to the communication system 100 (FIG. 1) for receiving invitation information from an inviting user entity 110. The invitation information indicates the invited user entities 112, a plurality of modes (such as audio only, audio and video, etc.) acceptable for a mixed mode conference call and a selected one of the plurality of modes accepted by the inviting user entity 110. A conference call invitation controller 310 is coupled to the input handler 300 for generating an invitation message including information indicating the plurality of modes acceptable for the mixed mode conference call. The invitation message is provided by the conference call invitation controller 310 to an output handler 312 for provision to the communication system 100 for transmittal to the invited user entities 112 (FIG. 1).

The input handler 300 also receives messages from the plurality of user entities and provides the messages to a conference call controller 314. The conference call controller 314 determines which of the plurality of modes are accepted by each of the invited user entities 112 and sets up a mixed mode conference call where the invited user entity 110 and the inviting user entities 112 communicate on selected ones of a plurality of communication channels in response to the selected ones of the plurality of modes accepted by each. The channels may have different bandwidths depending upon the mode accepted by the user entity 110, 112.

Figure 4A:
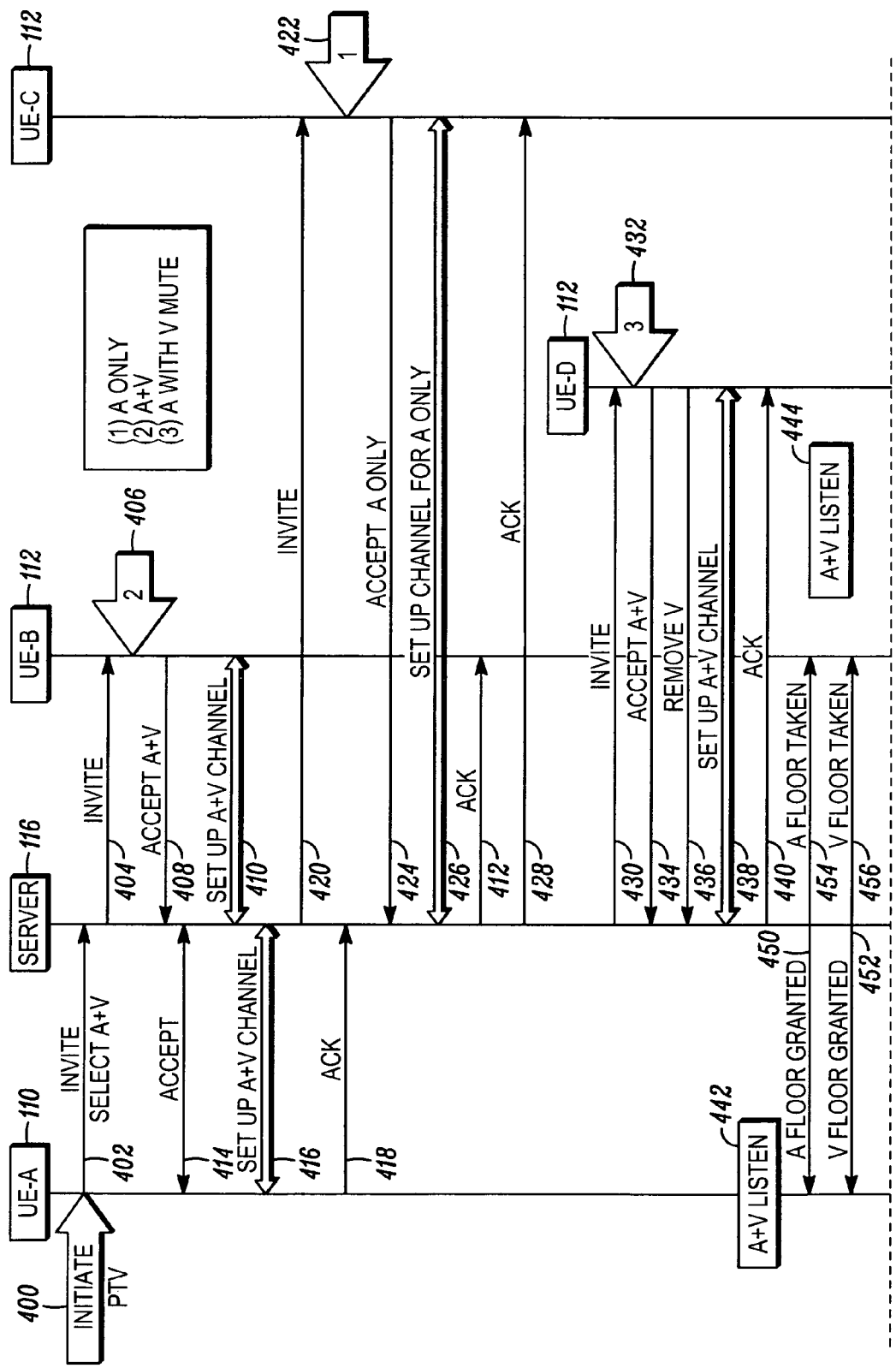
FIG. 4 is a communication flow diagram for the operation of the communication system of FIG. 1 during conference call establishment in accordance with the embodiment of the present invention.
Figure 4B:
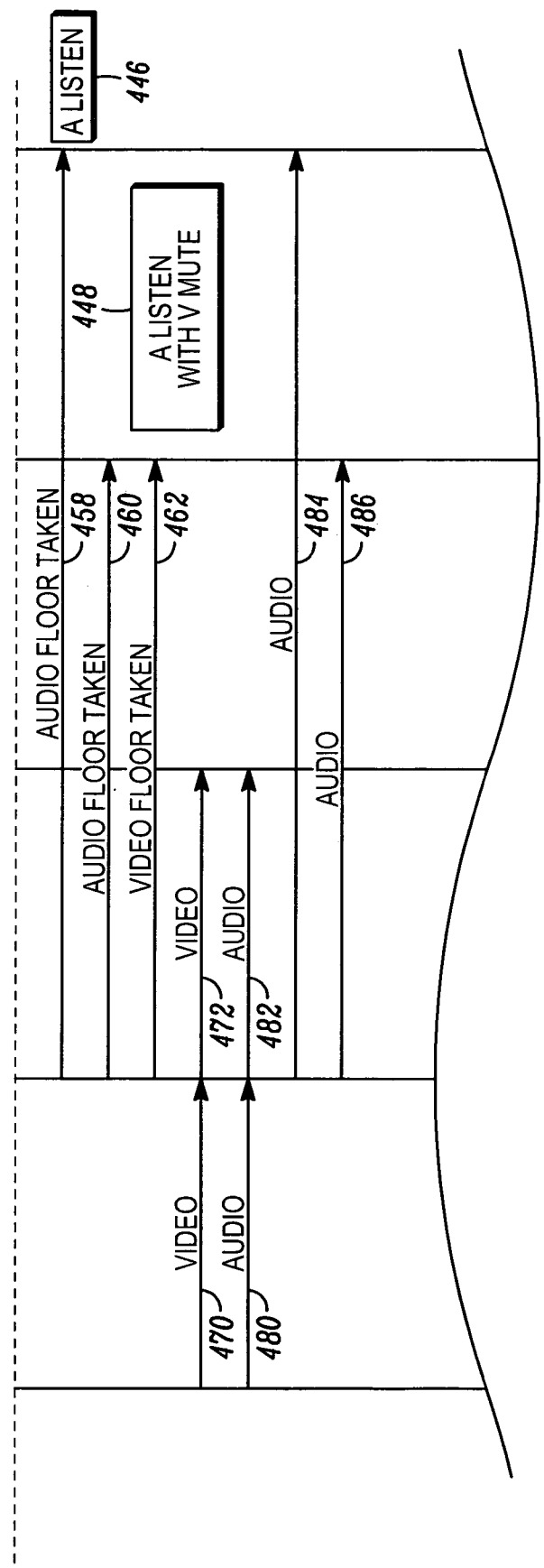

Operation of the system during mixed mode conference call establishment in accordance with the present invention is shown in the communication flow diagram of FIG. 4. The communication flow diagram of FIG. 4 is an example of mixed mode media set up during instant personal communication where there is no early session existing on the terminating ends and shows high level signaling procedures when one user entity 110, UE-A, initiates a PTV group session with three other user entities 112, UE-B, UE-C, and UE-D. During the multimedia session, the mixed mode conference call of FIG. 4 allows group participants to participate in one of the following plurality of modes: Audio+Video, Audio only, or Audio+Video mute. Although the concepts described here is in the context of Push to Video (PTV) services, the same can be applied to different multimedia data session scenarios.

The inviting user entity 110 initiates the PTV services 400 by providing invitation information 402 to the server 116. The invitation information indicates which invited users 112 to invite, a modes acceptable for the mixed mode conference call (Audio+Video, Audio only, or Audio+Video mute), and the selected one of the modes (Audio+Video) accepted by the inviting user entity 110.

The controlling PTV server 116 supports conventional server functions with video extension support and could be either at the same administrative domain as the inviting user entity 110 (A) or could be at one of the inviting user entities' 112 domains. In accordance with the embodiment of FIG. 4, the controlling PTV function is performed by the server 116 in the administrative domain of the inviting user 110. Hence the participating and controlling PTV functions are performed in server 116. User entities 110 (B, C and D) could be either in the same domain as in A or could be in a different domain.

The server 116 forwards an invitation to user entity B indicating the modes acceptable for the mixed mode conference call 404. User entity B selects the second option (Audio+Video) 406 and provides a response 408 to the server 116 indicating the selected one of the modes accepted by user entity B. The server sets up a communication channel 410 having a bandwidth selected in response to the mode accepted by user entity B and acknowledges setup 412.

As one of the invitees has accepted the invitation 408 with a selected mode other than an Audio only mode, the server confirms 414 the mode selected by the inviting user, user entity A, 110, sets up a communication channel 416 having a bandwidth selected in response to the mode accepted by user entity A and acknowledges setup 418.

Next, the server 116 forwards an invitation to user entity C indicating the modes acceptable for the mixed mode conference call 420. User entity C selects the first option (Audio only) 422, a lower bandwidth requiring mode, and provides a response 424 to the server 116 indicating the selected one of the modes accepted by user entity C. It can be seen that it is possible to include a user entity that supports only audio conferencing (not video) in the communication system 100 in accordance with the present invention, such user entity automatically selecting the audio only mode 422. The server then sets up a communication channel 426 having a smaller bandwidth selected in response to the audio only mode accepted by user entity B and acknowledges setup 428.

Then the server 116 forwards an invitation to user entity D 430. User entity D selects the third option (Audio with Video mute) 432 and provides a response 434 to the server 116 indicating the selected one of the modes accepted by user entity D. User entity D sends a message to mute or remove the video 436, after which the server sets up a communication channel 438 having a bandwidth selected in response to the mode accepted by user entity B and acknowledges setup 440.

Initially, the conference call places user entity A in an audio and video talk role 442, user entity B in an audio and video listen role 444, user entity C in an audio listen role 446, and user entity D in an audio listen with video mute role 448. This is accomplished by the server 116 providing the audio floor grant 450 and the video floor grant 452 to the user entity A. An audio floor taken is provided to user entity B 454, user entity C 458 and user entity D 460. A video floor taken is provided to user entity B 456 and user entity D 462. The video displays 216 (FIG. 2) of the user entities 110, 112 that are receiving audio only are displayed with the standard idle screen, either a camera view, stored images Since user entity A has been granted the floor for both audio 450 and video 452, video 470 and audio 480 are streamed from user entity A to the server 116. The audio is multicast to user entity B 482, user entity C 484 and user entity D 486 and, after synchronization of the audio and video at the server 116, the audio 482 and video streams are multicast to user entity B. Thus the conference call is setup where each user entity 110, 112 communicates in the selected mode accepted by that user entity 110, 112.

In accordance with PTV operation, early sessions can be utilized in accordance with the present invention. The user entity 110, 112 provides an early session configuration setting for the PTV default service initiation upon providing a predetermined user input, such as pressing the PTV hard key 218 (FIG. 2). PTV service settings are generally PTV Chat, PTV Stream and PTT, as described above. Depending on the default setting (factory is typically PTT) upon user entity registration or at a later time, user can initiate an early session. An early session initiates a media negotiation with the PTV server to pre-establish a session to transport audio or audio+video. Also, it is possible that a server in response to the user entity request can pre-establish a session for talk only and therefore can participate on the terminating side of a PTV session Likewise, in accordance with conventional PTV operation, early media is treated similarly with the exception that a user entity 110, 112 is set to an early media auto mode with the default selection set either to audio only or audio with video mute. Late media is treated the same with the exception that the PTV server 116 will grant floor idle indication 442 or start audio+video streaming indication 442 to the inviting user entity 110 if at least one invited user entity 112 accepted the call with Audio+Video. If none has accepted the call, the session shall be terminated and termination indication is given to the inviting user 442. If all invited users have accepted the call in Audio only mode, the inviting user is notified with an option to set up a PTT call or terminate a call (see FIG. 10 below).

During the mixed mode conference call establishment phase of FIG. 4, the invited user entities 112 are given options to participate in a PTV multimedia call as: Audio only (Option 1), Audio and Video (Option 2), or Audio with Video mute (Option 3). This allows the server 116 to set up a communication channel with just enough bandwidth to transport the requested media during the communication phase. Since the communication channel is set up upfront during the establishment phase, user entities who have chosen option 2 and 3 will have the option to downgrade the call, and then upgrade if they choose, without renegotiation for a communication channel or re-establishing a conference call. In conventional PTV services a user may "Add video stream" on an existing PTT call by selecting a specific PTV call mode, such as PTV Stream or PTV Chat. However, a user needs to own floor controls for both audio and video before initiating a downgrade. In accordance with the present invention downgrade (i.e., removing a stream) or upgrade (i.e., adding a stream) can be accomplished without renegotiation of communication channels or re-establishment of the conference as mandated per 3GPP TS 23.228 whenever a codec or media changes during a call.

Figure 5:
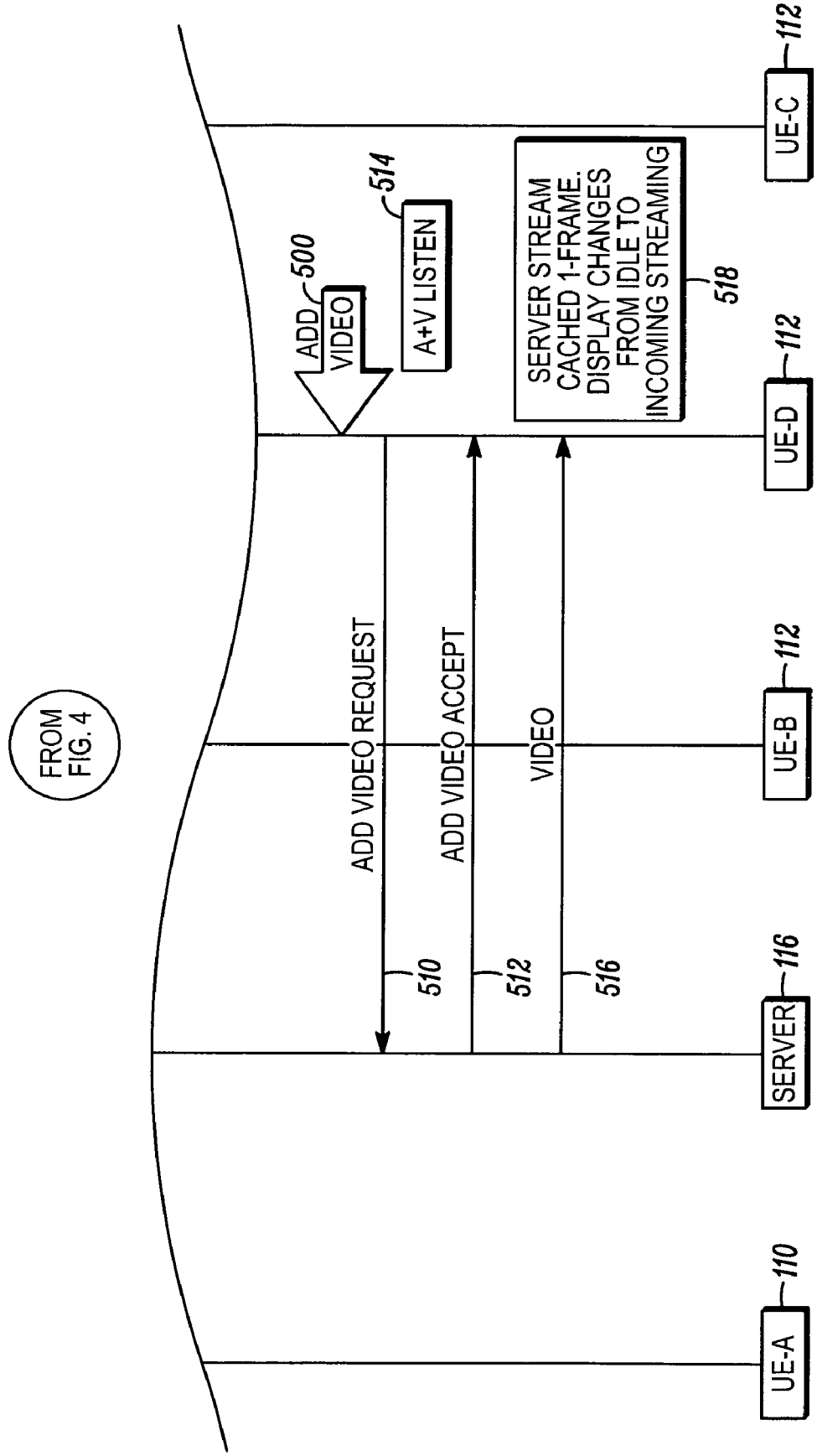
FIG. 5 is a communication flow diagram for the operation of the communication system of FIG. 1 during a user upgrade of media mode during a conference call in accordance with the embodiment of the present invention.

Referring to FIG. 5, a communication flow diagram for upgrading is shown. The upgrade can be initiated by any user who is participating in Audio with Video mute, such as user entity D. This could be a user who begins a conference while moving and, when he arrives at an appropriate location, wishes to receive both the video and the audio.

User entity D has selected option 3 and an audio listen with video mute indication 448 is displayed. When user entity D wishes to add video 500, a request is sent to the server 116 indicating that the user entity 112 desires to upgrade the mode selected by user entity D 510. The server 116 accepts the upgrade request 512 and an audio+video indication is displayed 514. The streaming video is then provided 516 to user entity D along with the audio 486. The display 216 (FIG. 2) transitions from its idle state to display the incoming streaming video 518.

Figure 6:
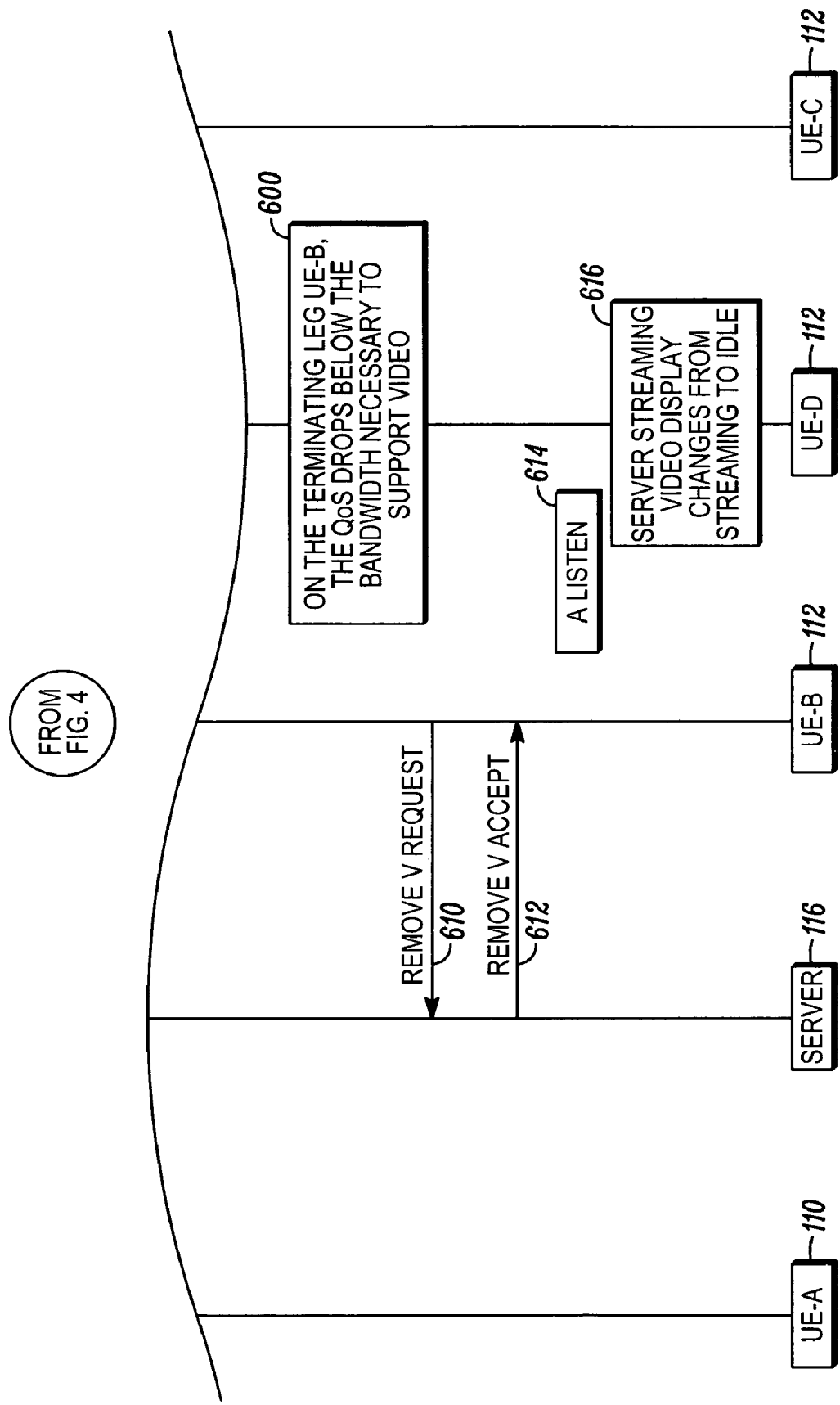
FIG. 6 is a communication flow diagram for the operation of the communication system of FIG. 1 during a terminal initiated auto downgrade of media mode during a conference call in accordance with the embodiment of the present invention.

In a similar manner, participants in a conference call can downgrade the services they are receiving. Referring to FIG. 6, any user entity who is currently receiving audio and video may initiate a downgrade. The procedure is similar to upgrade however, the video floor owner is not allowed to downgrade a PTV call if there is at least one member on the conference call receiving in the video or video mute mode. In addition to the user initiating the downgrade, the user entity 112 may automatically initiate a downgrade. The user entities alter the channel bandwidth when the signal strength changes while roaming. If the bandwidth user entity B, a user entity 112 that is participating in A+V mode, falls below a threshold to support video 600, user entity B will automatically invoke downgrade procedure by sending a drop video request 610 to the server 116. The server accepts the request and stops streaming video 612 to user entity B. A listen indication is provided 614 and the display 216 transitions from the incoming streaming video into a stored image 616. If the user entity 112 is in a video talk mode whereby audio is transmitted over the video channel, the downgrade is accomplished by requesting the downgrade 610 and the server 116 accepting the request and stopping the streaming video 612. Upon receiving the accept response from the server 116, the user entity 112 will start initiating renegotiation for an audio only channel.

In accordance with the present invention, upgrade and downgrade is accomplished by sending a Realtime Transfer Control Protocol (RTCP) message to the server 116 and can be initiated by a user entity 112 within an existing bandwidth reservation. It is also possible that the network can initiate similar procedures when the bandwidth changes dynamically. A set of RTCP protocol data structures to support upgrade and downgrade in accordance with the present invention are shown in FIGS. 7, 8 and 9.

The definition of the fields in the RTCP APP packet is found in RFC 3550. Referring to FIG. 7, the length field 710 in the RTCP header is the length of the packet in 32-bit words, not counting the first 32-bit word in which the length field resides. The 4-byte ASCII string 712 in the RTCP header shall be used to define the set of floor control packets to be unique with respect to other APP packets that the application might receive. For PTV the ASCII name string 714 shall be "PTV1". The use of application dependent data will vary on the packet use. The data structure of FIG. 7 is a request for upgrade or downgrade of services from the user entity 112 to the server 116. A "00000" in the subtype field 712 indicates an upgrade request (i.e., a request to add a video or audio stream). A "00001" in the subtype field 712 indicates a downgrade request (i.e., a request to remove a video or audio stream). The media to be added or removed is described in the media field 716—"0000" for video, "0001" for audio, and "0010" for audio and video. Another field 718 provides an indicator of the particular user entity 112 that is sending the RTCP message 700.

Referring to FIG. 8, a server accept RTCP message 800 is shown. The length of the RTCP message 800 is "2" as indicated in the length field 810. The subtype 812 is "10010" indicating that the server 116 has accepted the add or remove stream request 700. Field 814 provides the indicator of the particular server 116 and the name field 714 remains unchanged.

Referring to FIG. 9, a server denial RTCP message 900 has a subtype field 910 with "100011" indicating that the server 116 has denied the add or remove stream request 700. Length field 912 provides the length of the RTCP message, field 914 provides the indicator of the particular server 116 and the name field 714 remains unchanged. A reason is provided with the denial and includes a reason code field 916, a length of reason phrase field 918 and a reason phrase field 920. The reason codes 916 could be "0000 0000" indicating server error, "0000 0001" indicating bandwidth not available, "0000 0011" indicating the user entity is not capable of receiving video, or "0000 0100" indicating a video session is not active.

The present invention permits call interoperation during mixed mode conference call through use of the upgrade and downgrade procedures previously described. When a call is received by a user entity 110, 112, a user will be prompted whether they want to accept the incoming call or not. If YES, the current audio portion of the conference call will be on hold and the user entity 110, 112 provide the user the incoming circuit system (CS) voice call. The user can participate in both the video portion of the conference call and CS voice call.

If the user receives a CS voice call when the user entity 110, 112 is listening to audio+video, the conference call is downgraded to Video only by removing the audio and releasing the audio resources for the CS voice call. This allows simultaneous listening of Video conference call and the CS Audio call. If the user receives a CS voice call when the user entity 110, 112 is listening to Audio with Video mute, the conference call is upgrade to support A and Video by adding video and then the procedure for downgrading Audio+Video to video only as described above is performed.

If the user receives a CS voice call when the user entity 110, 112 holds the Audio or Video floor, the floor owner is not allowed to accept the incoming CS call as long as there is at least one listener on the conference call. Alternately, the user can put the current conference call on hold and accept the incoming CS call. If the user receives a CS voice call when the user entity 110, 112 is in Audio only listen mode, the user can put the conference call on hold and release the audio resources to accept incoming CS voice call.

Figure 10A:
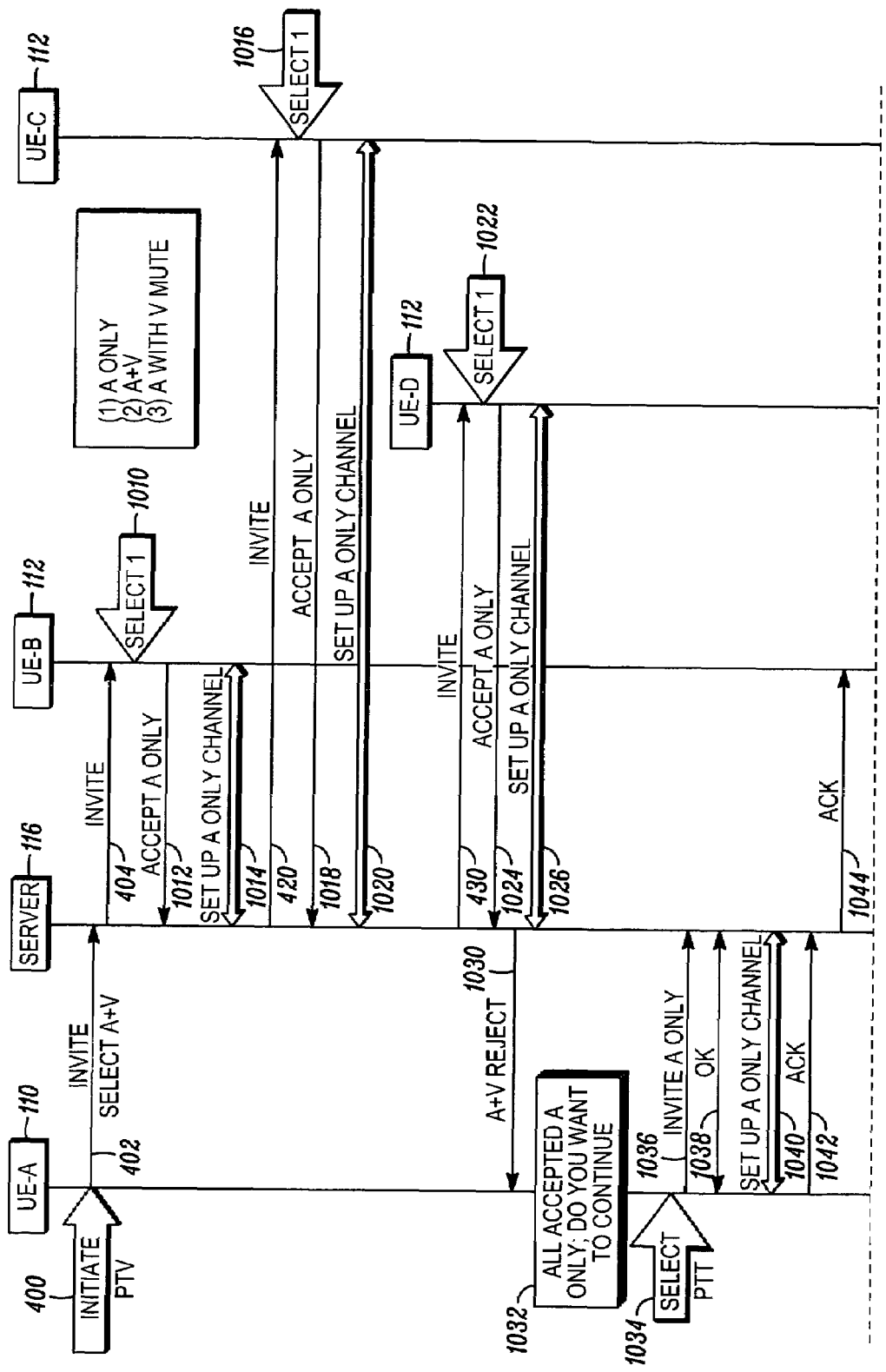
FIG. 10 is a communication flow diagram for the operation of the communication system of FIG. 1 when all users accept an audio-only conference call in accordance with the embodiment of the present invention.
Figure 10B:
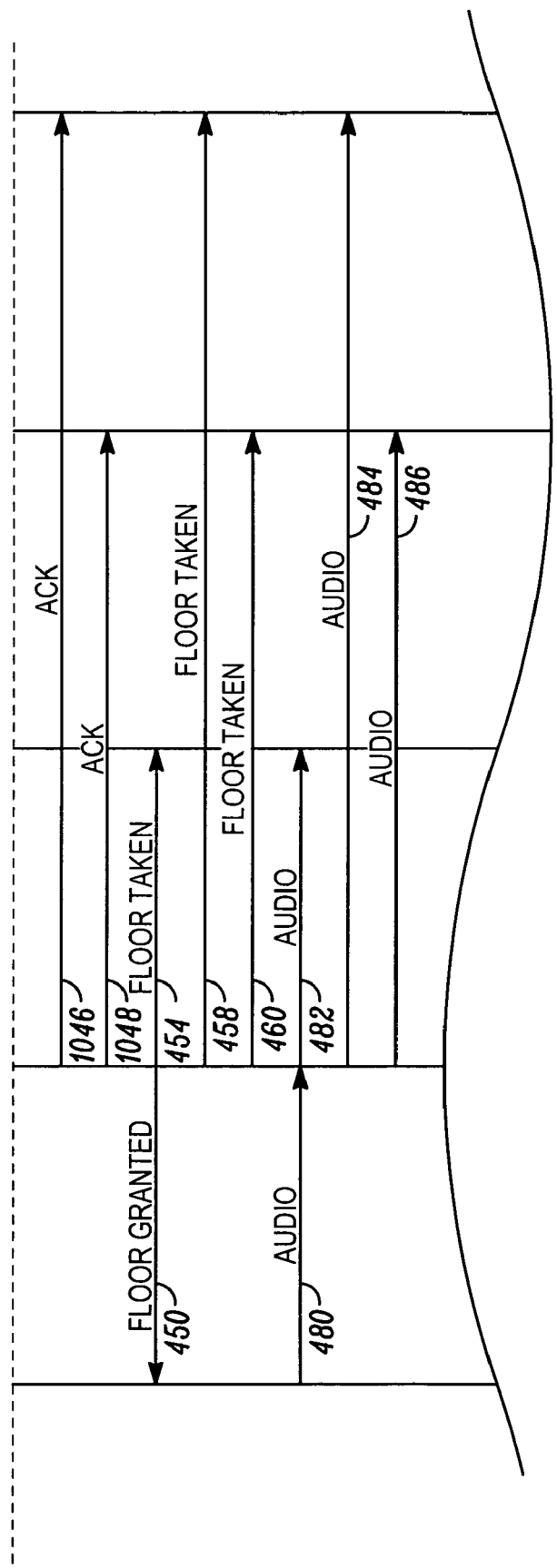

Referring to FIG. 10, the present invention also provides a means for converting a PTV conference call request to a PTT conference call when all of the invited user entities 112 reply that they want an Audio only conference call. Referring to the communication flow diagram of FIG. 10, the inviting user entity 110 initiates the PTV services 400 by providing invitation information 402 to the server 116. The invitation information indicates which invited users 112 to invite, a modes acceptable for the mixed mode conference call (Audio+

Video, Audio only, or Audio+Video mute), and the selected one of the modes (Audio+Video) accepted by the inviting user entity 110.

The server 116 forwards an invitation to user entity B indicating the modes acceptable for the mixed mode conference call 404. User entity B selects the first option (Audio only) 1010 and provides a response 1012 to the server 116 indicating the selected Audio only mode accepted by user entity B. The server sets up a communication channel 1014 having a lower bandwidth selected in response to the Audio only mode (i.e., lower bandwidth requiring mode) accepted by user entity B.

Next, the server 116 forwards an invitation to user entity C indicating the modes acceptable for the mixed mode conference call 420. User entity C selects the first option (Audio only) 1016, a lower bandwidth requiring mode, and provides a response 1018 to the server 116 indicating the selected one of the modes accepted by user entity C. The server then sets up a communication channel 1020 having a smaller bandwidth selected in response to the audio only mode accepted by user entity B. In a like manner, the server 116 forwards an invitation to user entity D 430. User entity D also selects the first option (Audio only) 1022 and provides a response 1024 to the server 116 indicating the selected one of the modes accepted by user entity D. The server sets up a communication channel 1026 having a bandwidth selected in response to the mode accepted by user entity B.

In response to all of the invited user entities 112 accepting the lower bandwidth requiring mode of Audio only, the present invention in an effort to efficiently use communication system resources, advises the inviting user entity 110 that the Audio+Video conference has been rejected 1030 and a message is displayed to the user that all of the invited user entities 112 have accepted the Audio only mode and requesting the inviting user entity 110 to confirm that he wants to continue 1032 (i.e., confirm that lower bandwidth requiring conference call is acceptable). If the inviting user entity indicates that the lower bandwidth requiring conference call is acceptable 1034 (i.e., selects a PTT call), the inviting user entity 110 sends a response 1036 to the server 116, the server 116 acknowledges the response for a PTT call 1038, and sets up a communication channel 1040 having a lower bandwidth selected for the Audio only PTT conference call. The server 116 then sets up the PTT call by acknowledging acceptance of the PTT call to user entity A 1042, user entity B 1044, user entity C 1046, and user entity D 1048

The server 116 then provides the audio floor grant 450 to the user entity A and the audio floor taken is provided to user entity B 454, user entity C 458 and user entity D 460.

Since user entity A has been granted the floor for audio 450, audio 480 is streamed from user entity A to the server 116. The audio is multicast to user entity B 484, user entity C 484, and user entity D 486. Thus, the PTT conference call is setup where each user entity 110, 112 communicates in the lower bandwidth requiring Audio-only mode accepted by that user entity 110, 112.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for mixed mode conference call setup comprising the steps of:
   inviting two or more users to a mixed mode conference call by providing invitation information from an inviting user to a server indicating the two or more users, a plurality of modes acceptable for the mixed mode conference call and a selected one of the plurality of modes accepted by the inviting user;
   providing an invitation from the server to each of the two or more users, the invitation including information indicating the plurality of modes acceptable for the mixed mode conference call;
   a first user of the two or more users providing a response to the server including information indicating a first mode of the plurality of modes which has been user selected by the first user of the two or more users;
   a second user of the two or more users providing a response to the server including information indicating a second mode of the plurality of modes which has been user selected by the second user of the two or more users, wherein the second mode of the plurality of modes is different from the first mode of the plurality of modes;
   the server setting up a mixed mode conference call for communicating in at least the first and second modes of the plurality of modes in response to the invitation information provided by the inviting user and each response from the two or more users; and
   the inviting user and the two or more users communicating in the mixed mode conference call in one of the plurality of modes, while the first user of the two or more users communicates in the mixed mode conference call in the first mode of the plurality of modes and the second user of the two or more users communicates in the mixed mode conference call in the second mode of the plurality of modes.

2. The method of claim 1 wherein the mixed mode conference call is a radio frequency (RF) conference call over RF communication channels.

3. The method of claim 2 wherein the RF conference call is a Push-To-Video (PTV) conference call.

4. The method of claim 1 wherein the plurality of modes includes a mode selected from the group of an audio-only mode, an audio and video mode, and an audio and video-mute mode.

5. The method of claim 1 wherein the step of the first user of the two or more users providing a response to the server includes the step of the first user of the two or more users providing a response to the server including information indicating that the first mode user selected by the first user of the two or more users is a lower bandwidth requiring mode of the plurality of modes; and
   providing a message to the inviting user requesting the inviting user to confirm that a lower bandwidth requiring conference call is acceptable.

6. The method of claim 5 wherein the step of setting up the mixed mode conference call comprises the step of, in response to receiving a response from the inviting user that the lower bandwidth requiring conference call is acceptable, setting up a lower bandwidth requiring conference call wherein the inviting user communicates in the lower bandwidth requiring mode in the mixed mode conference call with the first user of the two or more users.

7. The method of claim 6 wherein the lower bandwidth requiring conference call is an audio-only mode conference call.

8. The method of claim 1 wherein the step of the server setting up the mixed mode conference call comprises the steps of:
   the inviting user accepting two or more of the plurality of modes for communicating in the mixed mode conference call with the first and second users of the two or more users;
   setting up a first communication channel for the inviting user to communicate with the server, the communication channel having a bandwidth selected in response to the two or more of the plurality of modes accepted by the inviting user; and
   setting up at least two second communication channels for each of the two or more users to communicate with the server, each of the at least two second communication channels having a bandwidth selected in response to one of the plurality of modes user selected by a corresponding one of the two or more users, and wherein the step of communicating in the mixed mode conference call comprises the step of the inviting user communicating in the mixed mode conference call on the first communication channel while each of the two or more users communicate in the mixed mode conference call on a corresponding one of the at least two second communication channels.

9. The method of claim 8 wherein the step of communicating in the mixed mode conference call comprises the step of one of the two or more users communicating in the mixed mode conference call on one of the at least two second communication channels having a first bandwidth, the method further comprising the steps of:
   the one of the two or more users sending a request to the server comprising information indicating that the one of the two or more users desires to downgrade the one of the plurality of modes previously user selected by the one of the two or more users; and
   the server setting up a new communication channel for the one of the two or more users, the new communication channel having a second bandwidth selected in response to the request of the one of the two or more users, the second bandwidth being smaller than the first bandwidth; and
   thereafter the inviting user communicating in the mixed mode conference call on the first communication channel while each of the two or more users communicate in the mixed mode conference call on a corresponding one of the at least two second communication channels, wherein the one of the two or more users communicates in the mixed mode conference call on the new communication channel.

10. The method of claim 8 wherein the step of communicating in the mixed mode conference call comprises the step of one of the two or more users communicating in the mixed mode conference call on one of the at least two second communication channels having a first bandwidth, the method further comprising the steps of:
    the one of the two or more users sending a request to the server comprising information indicating that the one of the two or more users desires to upgrade the one of the plurality of modes previously user selected by the one of the two or more users; and
    the server setting up a new communication channel for the one of the two or more users, the new communication channel having a second bandwidth selected in response to the request of the one of the at least one user, the second bandwidth being larger than the first bandwidth; and
    thereafter the inviting user communicating in the mixed mode conference call on the first communication channel while each of the two or more users communicate in the mixed mode conference call on a corresponding one of the at least two second communication channels, wherein the one of the two or more users communicates in the mixed mode conference call on the new communication channel.

11. The method of claim 1 wherein the step of the first user of the two or more users providing a response to the server includes the step of the first user of the two or more users providing an automatic response to the server including information indicating the first mode of the plurality of modes selected in response to an early media auto mode of the first user of the two or more users.

12. The method of claim 1 wherein the step of the first user of the two or more users providing a response to the server includes the steps of:
    the first user of the two or more users receiving the invitation;
    the first user of the two or more users selecting the first mode of the plurality of modes acceptable for the mixed mode conference call; and
    the first user of the two or more users providing a response to the server including information indicating the first mode of the plurality of modes as the selected one of the plurality of modes user selected by the first user of the two or more users.

13. The method of claim 1 further comprising the step of storing an early session configuration setting for a predetermined user input, and wherein the step of inviting the two or more users to the mixed mode conference call includes the steps of:
    providing the predetermined user input; and
    inviting the two or more users to the mixed mode conference call by providing invitation information from the inviting user to the server indicating the two or more users, a plurality of modes acceptable for the mixed mode conference call and a selected one of the plurality of modes accepted by the inviting user, wherein the mixed mode conference call, the plurality of modes acceptable therefor, and the selected one of the plurality of modes accepted by the inviting user are defined by the early session configuration setting in response to the predetermined user input.

14. The method of claim 13 wherein the early session configuration setting is a setting selected from the group of Push-To-Video (PTV) Chat, PTV Stream and Push-To-Talk (PTT).

15. A server in a communication system comprising a plurality of user entities, the server comprising:
    an input handler coupled to the communication system for receiving invitation information from an inviting user entity, the inviting user entity being one of the plurality of user entities and the invitation information indicating two or more of the plurality of user entities as invited user entities, a plurality of modes acceptable for a mixed mode conference call and a selected one of the plurality of modes accepted by the inviting user entity, the input handler further receiving messages from the two or more of the plurality of user entities;
    a conference call invitation controller coupled to the input handler for generating an invitation message in response to the invitation information, the invitation message comprising information indicating the plurality of modes acceptable for the mixed mode conference call;

an output handler coupled to the conference call invitation controller and the communication system for providing the invitation message to the communication system for transmitting to the invited user entities; and a conference call controller coupled to the input handler for receiving the messages therefrom and determining in response to the messages two or more of the plurality of modes user selected by the invited user entities and accepted by the inviting user entity, the conference call controller setting up the mixed mode conference call where the invited user entities and the inviting user entity communicate with the server on two or more selected ones of a plurality of communication channels in the two or more of the plurality of modes in response to the selected ones of the plurality of modes user selected by the invited user entities and accepted by the inviting user entity.

16. The server of claim 15 wherein the conference call controller provides a message to the inviting user entity requesting the inviting user entity to confirm that a lower bandwidth requiring conference call is acceptable to the inviting user in response to determining that the responses for all of the invited user entities included information indicating a bandwidth requiring mode of the plurality of modes had been accepted by each of the invited user entities having a lower bandwidth than the selected one of the plurality of modes accepted by the inviting user entity, and, thereafter, in response to receiving a response from the inviting user entity that the bandwidth requiring conference call having the lower bandwidth is acceptable, setting up a lower bandwidth requiring conference call as the mixed mode conference call wherein each of the invited user entities and the inviting user entity communicate in a bandwidth requiring mode for the lower bandwidth requiring conference call having a bandwidth equal to or lower than the lower bandwidth.

17. The server of claim 15 wherein the conference call controller, after setting up the mixed mode conference call, sets up a second one of the plurality of communication channels for one of the invited user entities and terminates a first one of the plurality of communication channels for the one of the invited user entities in response to one of the messages from the one of the invited user entities indicating that the one of the invited user entities desires to downgrade the selected one of the plurality of modes previously user selected by the one of the the invited user entities, the second one of the plurality of communication channels having a second bandwidth smaller than a first bandwidth of the first one of the plurality of communication channels.

18. The server of claim 15 wherein the conference call controller, after setting up the mixed mode conference call, sets up a second one of the plurality of communication channels for one of the invited user entities and terminates a first one of the plurality of communication channels for the one of the invited user entities in response to one of the messages from the one of the invited user entities indicating that the one of the invited user entities desires to upgrade the selected one of the plurality of modes previously user selected by the one of the invited user entities, the second one of the plurality of communication channels having a second bandwidth larger than a first bandwidth of the first one of the plurality of communication channels.

19. A communication system comprising:

a plurality of user entities wherein one of the plurality of user entities can choose to be an inviting user entity for initiating a mixed mode conference call and wherein the inviting user entity can choose at least one other of the plurality of user entities to be an invited user entity, each of the plurality of user entities capable of being coupled to other of the plurality of user entities on one of a plurality of communication channels; and a server coupled to the inviting user entity and capable of coupling to other ones of the plurality of user entities, the server comprising:

a conference call invitation controller for generating an invitation message in response to information received from the inviting user entity, the invitation message indicating a plurality of modes acceptable for the mixed mode conference call; and a conference call controller for determining which of the plurality of modes have been accepted by each invited user entity and for setting up the mixed mode conference call where each of the invited user entity and the inviting user entity communicate on selected ones of the plurality of communication channels in response to the selected ones of the plurality of modes accepted thereby, wherein the conference call controller, after setting up the mixed mode conference call, sets up a second one of the plurality of communication channels for one of the plurality of user entities and terminates a first one of the plurality of communication channels for the one of the plurality of user entities in response to the one of the plurality of user entities indicating that the one of the plurality of user entities desires to change the selected one of the plurality of modes previously selected by the one of the plurality of user entities, the second one of the plurality of communication channels having a second bandwidth smaller than a first bandwidth of the first one of the plurality of communication channels if the one of the plurality of user entities indicates that the one of the plurality of user entities desires to downgrade the selected one of the plurality of modes and the second one of the plurality of communication channels having a second bandwidth larger than a first bandwidth of the first one of the plurality of communication channels if the one of the plurality of user entities indicates that the one of the plurality of user entities desires to upgrade the selected one of the plurality of modes.

* * * * *